UNITED STATES PATENT OFFICE.

SAMUEL T. DOBYNS, OF NORTH MIDDLETOWN, KENTUCKY, ASSIGNOR OF ONE-HALF HIS RIGHT TO ALFRED T. MITCHELL, OF SAME PLACE.

IMPROVEMENT IN CATARRH REMEDIES.

Specification forming part of Letters Patent No. 212,667, dated February 25, 1879; application filed December 27, 1878.

*To all whom it may concern:*

Be it known that I, SAMUEL T. DOBYNS, of North Middletown, in the county of Bourbon, and in the State of Kentucky, have invented certain new and useful Improvements in Compounds for the Cure of Catarrh; and do hereby declare that the following is a full, clear, and exact description thereof.

The nature of my invention consists in the use of common salt, camphor, and carbolic acid, mixed and compounded together, as will be hereinafter stated, to be used as snuff, for the cure of nasal catarrh and similar diseases.

To enable those skilled in the art to prepare this mixture, I will proceed to describe its mode of preparation.

To prepare this medicine, I take two drams of common salt, ten grains of pulverized camphor, and five drops of carbolic acid. These ingredients are thoroughly mixed in a suitable mortar, the salt being ground or rubbed into a powder.

When the ingredients have been suitably united the preparation is used as a snuff as often as the patient may feel its need.

I am aware of the catarrh remedy known as "Sage's," of which an analysis has been published in the American Journal of Pharmacy of 1874 and 1877, and I do not claim such as my invention.

Having thus fully described my invention, what I claim is—

The within-described compound, composed of common salt, camphor, and carbolic acid, substantially as and in the proportions set forth.

In testimony that I claim the foregoing I have hereunto set my hand this 23d day of November, 1878.

SAMUEL T. DOBYNS.

Witnesses:
A. T. MITCHELL,
W. T. MOBERLEY.